Jan. 18, 1966   C. C. HILL   3,229,465
GAS TURBINE POWER PLANT

Original Filed June 26, 1959   2 Sheets-Sheet 1

INVENTOR.
CHARLES C. HILL
BY
Barnes, Kisselle, Raisch & Choate
ATTORNEYS

Jan. 18, 1966     C. C. HILL     3,229,465

GAS TURBINE POWER PLANT

Original Filed June 26, 1959     2 Sheets-Sheet 2

INVENTOR.
CHARLES C. HILL
BY
Barnes, Kisselle, Raisch & Choate
ATTORNEYS

United States Patent Office 3,229,465
Patented Jan. 18, 1966

3,229,465
GAS TURBINE POWER PLANT
Charles C. Hill, 1148 Vesper, Ann Arbor, Mich.
Original application June 26, 1959, Ser. No. 823,197, now Patent No. 3,118,278, dated Jan. 21, 1964. Divided and this application Mar. 22, 1963, Ser. No. 267,282
5 Claims. (Cl. 60—39.74)

This application is a division of my copending application Serial No. 823,197, filed June 26, 1959, now Patent Number 3, 118,278, to which reference can be made for details of construction not shown or described in the present application.

This invention relates to gas turbine power plants.

It is an object of the invention to provide a gas turbine power plant which is light in weight, compact and efficient.

It is a further object of the invention to provide such a power plant which can be easily manufactured at relatively low cost as compared to the cost of prior gas turbine power plants.

It is a further object of the invention to provide a gas turbine power plant which includes novel structure for maintaining concentricity between associated parts thereof.

It is a further object of the invention to provide such a gas turbine power plant having a novel burner construction which eliminates the formation of hot spots or areas on either the burner casing or the turbine stator or rotor during operation of the power plant.

It is a further object of the invention to provide such a gas turbine power plant which is so constructed that it can be readily assembled and disassembled to facilitate maintenance.

Basically, the gas turbine power plant comprises a compressor, a burner and a turbine positioned between the compressor and burner. Air is drawn by the compressor impeller through a sound absorbing passageway and is then passed axially through a heat exchanger surrounding the turbine to a burner. The burner provides a continuously rotating fuel spray at a predetermined speed such as to prevent the creation of hot spots on various areas of the power plant. The gases of combustion are directed axially from the burner through the turbine and thereafter around the turbine and radially outwardly through the heat exchanger.

Figure 1:
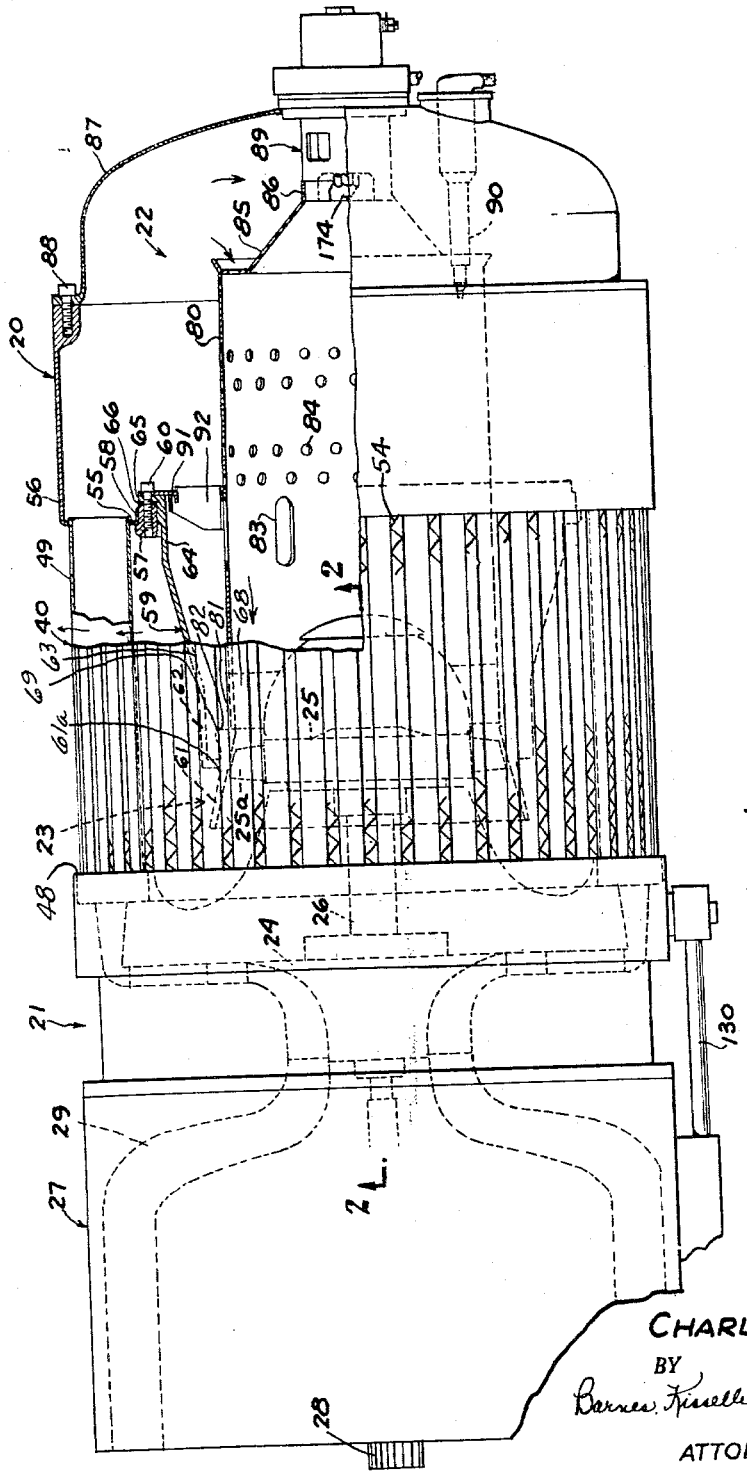
FIG. 1 is a fragmentary part sectional elevation of the gas turbine power plant made in accordance with the invention.

Referring to FIG. 1, power plant 20 embodying the invention comprises a compressor generally designated 21 which draws air from the atmosphere through an axial intake chamber 29 in housing 27. Air flows axially from compressor 21 through a heat exchanger 40 surrounding a turbine 23 to a burner 22 as more fully described below. The air is mixed with fuel in burner 22 and the gases of combustion pass from burner 22 to the turbine 23. The exhaust gases from turbine 23 pass radially outwardly through heat exchanger 40 and are exhausted to the atmosphere. Compressor impeller 24 and turbine rotor 25 are fixed on a shaft 26 which provides a drive to reduction gearing in housing 27 at one end of the power plant which, in turn, provides power to an output shaft 28.

As shown in FIG. 1, the ends of the tubes 49 opposite manifold 48 extend through a radial end wall 55 of a cylindrical shell 56 and passes the air through tubes 49 into the cylindrical shell 56. A ring 57 is fastened to a flange 58 around the inner periphery of the wall 55 and a turbine shroud assembly 59 is mounted on the ring 57 by bolts 60.

As shown in FIG. 1, shroud assembly 59 includes a frusto-conical portion 61 surrounding the outer ends of the blades 25a on the turbine rotor 25, a first cylindrical portion 62 fastened at one end of a radial flange 61a on portion 61, an integral conical portion 63 extending from the opposite end of the cylindrical portion 62 and a second cylindrical portion 64 extending from the conical portion 63 (FIG. 1). Turbine shroud assembly 59 also includes a flange 65 on the end of portion 64 which engages the ring 57 and through which bolts 60 extend (FIG. 1). Shims 66 may be provided between the flange 65 and the rings 57 to accurately position the frusto-conical portion 61 of turbine shroud assembly axially relative to the rotor 25 and thereby control the spacing between the outer end of the rotor blades 25a and the inner surface of the frusto-conical portion 61.

Referring to FIG. 1, a generally cylindrical flame tube 80 is provided in the power plant and has its inner end formed with a flange 81 engaging but unattached to the end of mounting ring 69 and piloted therein by a lip 82 on ring 69. Flame tube 80 is supported in position by clips 91 held in place on ring 57 by bolts 69. Each clip 91 engages a retainer loop 92 mounted on the exterior of tube 80 intermediate its ends. Flame tube 80 is formed with a plurality of openings 83, 84 which permit air from the compressor to pass from the shell 56 radially inwardly into the tube. A generally frustoconical member 85 telescopes into the outer end of tube 80 and centers the outer end of tube 80. Member 85 is formed at its outer end with an axial opening 86. The outer end of shell 56 is closed by a dished and flanged head 87 which is fixed to the end of shell 56 by bolts 88. Dished head 87 supports a fuel nozzle assembly 89 and an igniter 90. Fuel nozzle assembly 89 extends into the open outer end of member 85 and provides a rotating spray of fuel to the interior of the flame tube 80 as presently described.

The burner nozzle structure is adapted to provide a symmetrical fuel spray to flame tube 80 in order to prevent hot spots on the flame tube 80 and turbine stator 68 and turbine rotor blades 25a which ordinarily occur because of the unsymmetrical temperature distribution of the fuel spray. Such hot spots cause thermal stresses which result in cracks, fractures and similar failures. It is well known that even in carefully manufactured fuel nozzles a substantially degree of asymmetry exists. This asymmetry is further accentuated by the build up of carbon deposits and wear in use.

Basically, in the burner nozzle structure embodying the invention, the fuel nozzle is rotated at a controlled speed such that any portion of the spray will not be in contact with the flame tube, turbine stator or turbine rotor blades for a period of time greater than the period required for that portion to achieve a certain temperature change.

Figures 2, 3:
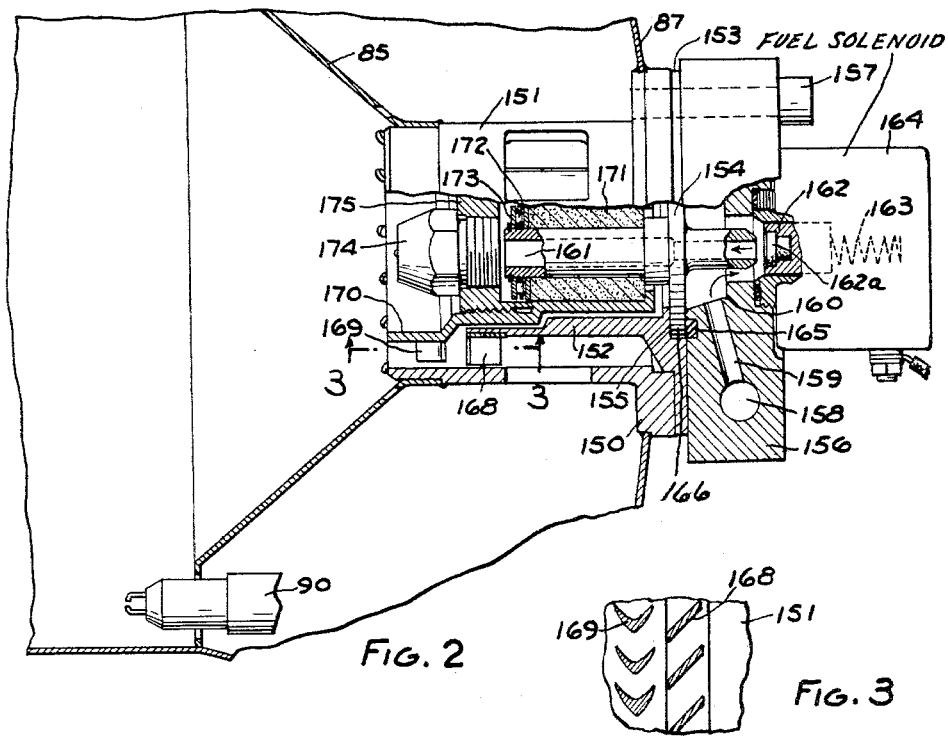
FIG. 2 is a fragmentary part sectional view of the burner nozzle assembly.
FIG. 3 is a fragmentary sectional view taken along the line 3—3 in FIG. 2.

As shown in FIGS. 2 and 3, the fuel nozzle structure comprises a mounting ring 150 welded in an opening in the burner head 87 and having a generally cylindrical and axially inwardly extending manifold 151. A swirler 152 having a peripheral flange 153 is mounted on the ring 150. A fuel nozzle shaft 154 is in turn mounted in an annular groove 155 on the swirler 152. A fuel distributor block 156 is mounted adjacent the outer surface of the swirler 152 and fuel nozzle shaft 154 and held in position by bolts 157 extending through flange 153 on swirler 152 into the ring 150. Fuel under pressure is provided from a pump (not shown) in the gear housing 27 to passage 158 in the distributor block 156 and flows from the passage through opening 159 into a chamber 160.

In operation, the fuel flows through an axial opening 161 in fuel nozzle shaft 154. When the gas turbine is not in operation, the end of the opening 161 is closed by a member 162 having a seal 162a on the end thereof and is yeldingly urged against the end of the shaft by a spring 163. A solenoid 164 surrounds member 162 and when energized moves member 162 outwardly away from the end of the shaft 154 against the action of the spring 163 to permit the fuel to flow through shaft 154. An O-ring 165 provides a liquid tight seal between the flange 166 on the shaft 154 and the face of the distributor block 156.

The inner end of a swirler 152 is provided with a plurality of circumferentially spaced radially extending swirler vanes 168 which direct the air passing through openings in manifold 151 into contact with vanes 169 on the periphery of a member 175 which is rotatably mounted on the shaft 154. The angular relationship and shape of the vanes 168, 169 is such that a turbine is created operating the member 170 over a predetermined range of speeds. A graphite bushing 171 is press fitted into the interior surface of the member 170 and is in rotating contact with the exterior of the shaft 154. The member 170 and bushing 171 form a single unit. A needle thrust bearing 172 is provided adjacent the end of bushing 171 and the member 170. Bushing 171 and bearing 172 are held against axial movement by a snap ring 173. A fuel spray nozzle 174 of conventional pressure spray type is threaded into an adapter plug 175 which, in turn, is fixed on member 170.

Fuel which may leak past graphite bushing 171 collects on the inner surface of swirler 152 and flows into the area of the vanes where it is directed inwardly into the flame tube by the air.

According to the invention, the vanes are so designed that the fuel nozzle 174 is rotated at a speed substantially less than the speed of rotation of the turbine rotor 25 so that any particular portion of the spray will not be in contact with a portion of the turbine rotor blades 25a for a greater period than the period required for that portion of the rotor blades 25a to achieve a certain temperature beyond which undesirable hot spots would be produced on the blades. At the same time, the vanes are so designed that the fuel nozzle 174 will be rotated at a speed sufficiently great so that no portion of the spray is in contact with the stator vanes 68 or flame tube 80 for a greater period than the period required for that portion of the stator vanes 68 or flame tube 80 to achieve a certain temperature beyond which undesirable hot spots would be produced. This period will of course depend upon the nature and thickness of the material. I have found it preferable to have the speed of rotation of the fuel nozzle 174 be less than one-tenth the speed of rotation of the turbine rotor 25 and preferably such that any portion of the fuel spray is in contact with any portion of the stator vanes 68 or flame tube 80 for a period less than one-tenth the time required for the thinnest portion of the stator vanes 68 or flame tube 80 to respond to a certain temperature change.

For example, if in a particular turbine, the maximum polar temperature gradient of the fuel spray is ±300° F., that is, the temperature of the burning fuel varies 600° F. circumferentially, and the flame tube responds to 600° F. temperature change in a time $t$; then the fuel spray must be rotated so that no portion of the burning fuel spray is in contact with a portion of the flame tube for a time $t$, and preferably so that the contact time is substantially less, say 0.10$t$.

By this arrangement, the danger of hot spots or areas on the turbine rotor or on the burner tube or stator vanes due to asymmetry in the fuel distribution is entirely eliminated.

It should of course be understood that other means may be provided for rotating the fuel nozzle 174, provided that such means can be accurately controlled to rotate the nozzle at the desired speed.

In addition to rotating the burner spray nozzle, the flow of air through the swirler vanes serves to prevent the deposition of carbon and the like on the inner surface of member 85 and to stabilize the combustion process by causing vortex flow and turbulence. To facilitate the vortex action, the vanes may be shortened providing a clearance between the tips of the vanes and manifold 151 so that some air may bypass the vanes.

In assembly before fastening all the bolts 60, flame tube 80 is slipped into position and the clips 91 are provided on some of bolts 60 to engage the retaining loops 92 and hold the tube 80 in position. Head 87 is then mounted on the other end of the shell 56. The fuel nozzle structure is mounted on head 87 before or after head 87 is mounted on shell 56. Finally, ignitor 90 is fastened to head 87.

*Operation*

The operation of the gas turbine power plant may be summarized as follows:

In order to start the gas turbine power plant, a starter in the housing 27 is energized electrically to rotate the shaft 26. This operates a fuel pump (not shown) and after the fuel pressure reaches a predetermined value, about 40 p.s.i., fuel solenoid 164 is energized and ignitor 90 is also energized. Operation of the starter causes air to be drawn into and from the compressor 21 to the burner 22 where it is mixed with fuel and ignited by the ignitor 90. The combustion gases then pass to the turbine 23 and operate on the turbine rotor 25 to rotate shaft 26. After combustion has begun, the starter and ignitor are de-energized and combustion continues with resultant operation of the power plant.

In operation, air is drawn by the compressor impeller 24 from the exterior through annular chamber 29 in housing 27 and is compressed and directed radially outwardly. The air then passes axially to the manifold 48 through the tubes 49 to the shell 56 (FIG. 1). The air then flows radially inwardly. The major portion of the air passes through the openings 84 in burner tube 80 and is mixed with the fuel emanating from nozzle 174 and the mixture is burned. Another portion of the air passes through openings 83 to cool or quench the combustion gases to the desired operating temperature. A portion of the air passes through the manifold 151 and causes the nozzle 174 to be rotated to provide a whirling spray of fuel. Another portion of the air passes axially between the turbine shroud 59 and tube 80 through the stator vanes 68 to cool the stator vanes.

The gases of combustion in flame tube 80 are directed by the stator vanes against the blades on the turbine rotor 25 and then are exhausted axially.

While the operation of the power plant continues, the rotation of the fuel nozzle 174 at a speed substantially less than the speed of rotation of the rotor 25 insures that synchronous hot spots will not be formed on the turbine rotor blades 25a. At the same time, since the speed of rotation of the nozzle is such that no region of the spray and resultant combustion gases contacts the stationary parts for a time greater than the time required for a predetermined temperature differential to occur, hot spots will not be formed on the stationary parts.

A typical gas turbine power plant embodying the invention has the following general specifications:

| | |
|---|---|
| Power rating | 75 hp. |
| Output shaft speed | 3600 r.p.m. |
| Turbine shaft speed | 50,000 r.p.m. |
| Length | 39.60 in. |
| Diameter | 14.0 in. |
| Weight | 125 lbs. |

| | |
|---|---|
| Fuels | Diesel, kerosene, fuel oil, jet fuel or gasoline, liquified petroleum gases and natural gases. |
| Compressor pressure ratio | 3.0–1. |
| Turbine inlet temperature | 1500° F. |
| Air flow | 2.2 lbs./sec. |

It can thus be seen that I have provided a gas turbine power plant which is light in weight and compact and efficient. The simplicity of design permits the power plant to be constructed at a relatively low cost as compared to the cost of prior gas turbine power plants. The construction of the power plant not only results in savings in cost of manufacture but in addition in assembly and maintenance. The use of the novel fuel nozzel construction permits the various parts of the device to be made of relatively light weight material since hot spots are entirely avoided. This also prolongs the life of the turbine parts.

I claim:

1. In a gas turbine power plant comprising a turbine rotor, a burner, means for supplying fuel to said burner, means for directing the gases of combustion from said burner to said turbine rotor, the improvement wherein said burner comprises
   a pressure spray type fuel nozzle,
   means for mounting said nozzle for rotation axially within said power plant,
   and means for rotating said nozzle at a speed less than the speed of rotation of said turbine rotor and sufficiently great so that no portion of the burning fuel spray will be in contact with a stationary part of the power plant for a period sufficient for that part of the power plant to respond significantly to the maximum polar temperature difference.

2. The combination set forth in claim 1 wherein the speed of rotation of the burning fuel spray is such that any portion of the burning fuel is in contact with any stationary part of the power plant for less than one-tenth the time required for that part to respond to the maximum polar temperature difference of the burning fuel spray.

3. In a gas turbine power plant comprising a turbine rotor, a burner, means for supplying fuel to said burner, means for directing the gases of combustion from said burner to said turbine rotor, the improvement wherein said burner comprises
   a manifold adapter to be mounted in said power plant,
   said manifold having radial inlets and an axial outlet at one end thereof whereby fuel supply will pass through the radial inlets and axially out of said outlet,
   a pressure spray type fuel nozzle,
   a fuel nozzle shaft mounted generally centrally in said manifold and having an axially extending fuel passage whereby fuel supplied to one end of said fuel nozzle passes through said shaft,
   means for mounting said fuel nozzle on said fuel nozzle shaft in spaced relation to the other end of said shaft and for rotation relative to said shaft,
   and means for rotating said fuel nozzle at a speed less than the speed of rotation of said turbine rotor and sufficiently great so that no portion of the burning fuel spray will be in contact with a stationary part of the power plant for a period sufficient for that part of the power plant to respond significantly to the maximum polar temperature difference.

4. The combination set forth in claim 3 wherein said means for rotatably mounting said nozzle on said fuel nozzle shaft comprises a generally utbular member,
   radial bearing means between said shaft and said tubular member,
   axial bearing means between said radial bearing means and said other end of said shaft,
   said radial bearing means also serving to provide a seal to prevent the flow of fuel between said shaft and said tubular member.

5. The combination set forth in claim 4 including a tubular sleeve mounted between said tubular member and said manifold and having an open end adjacent the axial outlet of said manifold whereby fuel leaking between said radial bearing and said fuel nozzle shaft is directed into the axial outlet of said manifold.

References Cited by the Examiner

UNITED STATES PATENTS

| | | | |
|---|---|---|---|
| 2,853,227 | 9/1958 | Beardsley | 60—39.75 |
| 2,938,345 | 5/1960 | Perle | 60—39.74 |

FOREIGN PATENTS

| | | |
|---|---|---|
| 883,358 | 3/1943 | France. |

SAMUEL LEVINE, *Primary Examiner.*